(12) United States Patent
Pipe et al.

(10) Patent No.: US 8,262,118 B2
(45) Date of Patent: Sep. 11, 2012

(54) VEHICLE POWER UNIT AND BODY UNIT SYSTEM

(75) Inventors: Rickey A. Pipe, Greensboro, NC (US); Willard S. Yeakel, Greensboro, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 224 days.

(21) Appl. No.: 12/787,694

(22) Filed: May 26, 2010

(65) Prior Publication Data

US 2010/0301584 A1 Dec. 2, 2010

Related U.S. Application Data

(60) Provisional application No. 61/217,054, filed on May 26, 2009.

(51) Int. Cl.
*B62D 53/00* (2006.01)

(52) U.S. Cl. ........................................ 280/407; 280/441

(58) Field of Classification Search .............. 280/438.1, 280/441, 437, 407, 405.1; 414/498
See application file for complete search history.

(56) References Cited

U.S. PATENT DOCUMENTS

| | | | |
|---|---|---|---|
| 3,227,470 A * | 1/1966 | Funk | 280/407.1 |
| 3,411,600 A | 11/1968 | Loving | |
| 3,542,414 A | 11/1970 | Nelson | |
| 3,718,346 A | 2/1973 | Self | |
| 3,806,159 A | 4/1974 | Self | |
| 3,836,178 A | 9/1974 | Ham | |
| 3,841,511 A | 10/1974 | Haun | |
| 4,740,005 A * | 4/1988 | Babin | 280/407.1 |
| 6,231,064 B1 | 5/2001 | Curry | |
| 6,733,027 B2 | 5/2004 | Stragier | |

* cited by examiner

*Primary Examiner* — Tony Winner
(74) *Attorney, Agent, or Firm* — Martin Farrell; Michael Pruden

(57) ABSTRACT

A truck tractor and removable body unit system selectively configurable as a tractor and freight box or an articulated truck-trailer combination includes a truck tractor having a frame supporting a drive axle and a steer axle with a fifth wheel mounted on the frame, and a body unit having a body mounted on a frame, the frame supported by a wheeled axle and having a king pin for releasably engaging the fifth wheel on the truck tractor. The body unit includes a coupling mechanism for releasably coupling the truck tractor frame to constrain lateral movement between the truck tractor and the body unit while allowing relative vertical pivoting movement between the truck tractor and body unit about the king pin and fifth wheel. An adjustable spring mounted to one of the truck tractor and body unit to act between the truck tractor frame and the body unit frame to adjust a loading between the truck tractor frame and body unit.

17 Claims, 7 Drawing Sheets

VEHICLE POWER UNIT AND BODY UNIT SYSTEM

FIELD OF THE INVENTION

The invention relates to vehicles having removable bodies adapting the vehicle for different uses. More particularly, the invention relates to a vehicle power unit, such as a truck tractor, and a removable body unit allowing for the body unit carried by the truck tractor frame or coupled to the truck tractor frame by a fifth wheel.

BACKGROUND AND SUMMARY OF THE INVENTION

For operation on the U.S. interstate highway system, commercial vehicle configurations must comply with federal size and weight regulations (See, Code of Federal Regulations, Title 23, Part 658, Truck Size and Weight). Currently there are two common, federally-compliant tractor truck-trailer combinations: a tractor with a single 48 to 53 foot semi-trailer; and a tractor with a tandem of two, coupled, 28 foot semi-trailers. In the tandem semi-trailer-trailer arrangement, the second trailer is typically connected via a kingpin to a fifth wheel carried on an added convertor dolly which, in turn, is connected to the first trailer via a drawbar/pintle hook.

Some LCV (Long Combination Vehicle) configurations are permitted in a few Western US states. Examples of LCV configurations include a tandem of two 48 foot or longer trailers, a tandem of a 48 foot or longer trailer and a coupled 28 foot trailer, and a set of three coupled 28 foot trailers. However, LCV arrangements are not permitted under federal regulations and therefore are restricted to specific routes or areas of operation.

There are commonly used fixed add-on van bodies (called dromedary boxes) which may be mounted on the truck tractor frame and used to haul limited extra freight.

Many loads are volume sensitive and "cube-out", meaning the trailer volume is filled before the trailer weight limit is reached. This type of load is less efficient and generates unnecessary cost to the shipper (more trips are needed) and to the environment as more fuel is burned for the extra trips.

There is thus a need in the transportation industry to increase volume in truck tractor-trailer combinations within federal size and weight regulations. There is a need in the transportation industry to maximize freight loads (for both volume and weight). Resolving these needs will lower shipping costs, reduce fuel consumption by allowing fewer trips to move goods, and reduce highway congestion by having fewer trucks on the road.

The invention is directed to a novel truck tractor and trailer combination that fills this need. The invention comprises individual truck tractor and trailer components that in combination improve volume efficiency while complying with federal highway regulations and preserving the adaptability of the individual components.

The invention includes a van body or body unit mounted on a frame and having an axle assembly with a set of wheels on the frame extended behind the body. A coupling apparatus integrally mounts the van body to a truck tractor so as to form a non-horizontally articulated vehicle. A fifth wheel is provided at the rear end of the van body frame for connecting a conventional semi-trailer. Thus, a truck tractor and van body combination can selectively pull a semi-trailer.

Alternatively, the van body can be articulatedly coupled to the truck tractor at a fifth wheel on the truck tractor, thus forming a truck tractor-trailer combination.

According to the invention, a truck tractor and removable body unit system selectively configurable as a tractor and freight box combination or as an articulated truck tractor-trailer combination includes a truck tractor having a frame supported on a drive axle and a steer axle and having a fifth wheel mounted on the frame, and a body unit having a body mounted on a frame, the frame supported on an axle/wheel assembly and having a king pin for releasably engaging a fifth wheel, a coupling mechanism for releasably coupling the truck tractor frame and the body unit frame allowing relative vertical pivoting movement and constraining relative lateral movement between the truck tractor and body unit about the king pin and fifth wheel, the coupling mechanism releasably coupling a rear of the truck tractor frame to a location on the body unit spaced from the king pin, and an adjustable spring (e.g., an air spring) mounted to one of the truck tractor and body unit to act between the truck tractor frame and the body unit frame to adjust a loading between the truck tractor frame and body unit.

According to an aspect of the invention, the coupling mechanism includes a pair of laterally extending pins mounted to opposite sides of one of the truck tractor frame and body unit frame, and a pair of coupling plates mounted to opposite sides of the other of the truck tractor frame and body unit, the coupling plates each including a vertically oriented slot shaped to accept a pin and allow relative vertical movement of the pin in the slot.

According to another aspect of the invention, a trailing portion of the body unit frame extends beyond an end of the body, the axle assembly being mounted on the extended frame portion. A fifth wheel may be mounted on the trailing portion of the body unit frame for coupling and supporting a semi-trailer.

According to yet another aspect of the invention, the trailing portion of the body unit frame is movable between an extended position in which the axle assembly is positioned beyond the end of the body and a retracted position in which the axle assembly is disposed beneath the body. The retracted position of the axle assembly allows the body to be backed to a loading dock to facilitate loading and unloading. The body unit frame may include main frame rails having a profile defining a channel and the trailing portion of the body unit frame includes frame rails slidably nested in the channel of the body unit main frame rails.

According to the invention, the fifth wheel on the truck tractor frame is mounted for sliding for selectively positioning the fifth wheel on the truck tractor frame in a forward position (i.e., adjacent the truck tractor cab) and a rear position (i.e., adjacent a rear of the truck tractor frame).

According to another aspect of the invention, the axle assembly of the body unit is a steerable axle, and may be a self-steering axle or powered steering axle. According to another aspect, the steerable axle may be convertible between steerable and fixed axle functions.

BRIEF DESCRIPTION OF THE DRAWINGS

The invention will be better understood with reference to the following detailed description read in conjunction with the appended drawings, in which.

DETAILED DESCRIPTION

Figure 1:
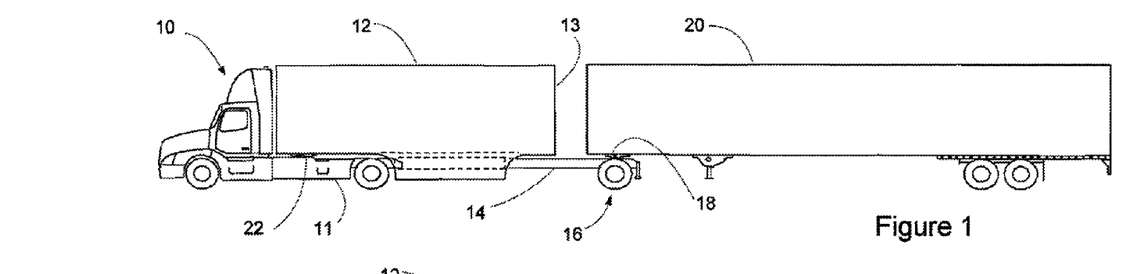
FIG. 1 is an illustrative side view of a truck tractor and body unit system in accordance with the invention configured as a truck tractor coupled with a semi-trailer.
Figure 2:
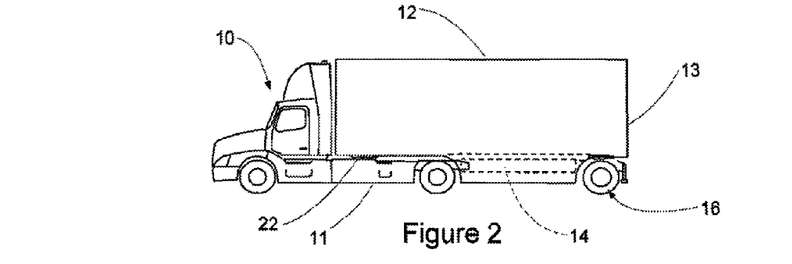
FIG. 2 is an illustrative side view of a truck tractor and body unit in accordance with the invention configured as a tractor and freight box combination.
Figure 3:
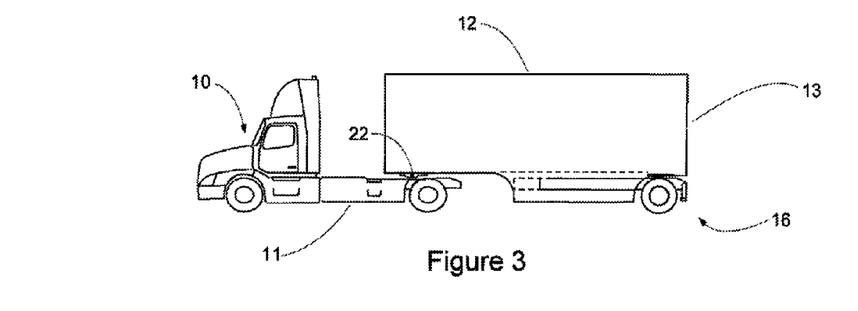
FIG. 3 is an illustrative side view of a truck tractor and body unit in accordance with the invention configured as a tractor-trailer combination.

FIGS. 1, 2 and 3 illustrate alternative arrangements of a truck tractor and removable body unit system in accordance with the invention. The arrangement in FIG. 1 shows a truck tractor 10, also referred to here as the power unit, with a body unit 12 coupled to the truck tractor for no horizontal articulation and a semi-trailer 20 coupled to the body unit extended frame 14. As described below and shown in FIG. 1 and FIG. 2, the body unit 12 is coupled to the power unit 10 at a fifth wheel 22 on the power unit and at a rear end of the power unit frame 11 so that the body unit 12 is constrained against lateral movement, or articulation, relative to the truck tractor.

In FIG. 1, a frame 14 of the body unit 12 extends beyond a rear of the body 13 and is supported by an axle assembly 16. The axle assembly 16 includes a conventional non-driven axle and suspension components. The frame 14 carries a fifth wheel 18 to which may be coupled a semi-trailer 20, as seen in FIG. 1. In this embodiment, the body unit is a 28 foot long unit, and the semi-trailer 20 is a 53 foot trailer.

Figure 5:
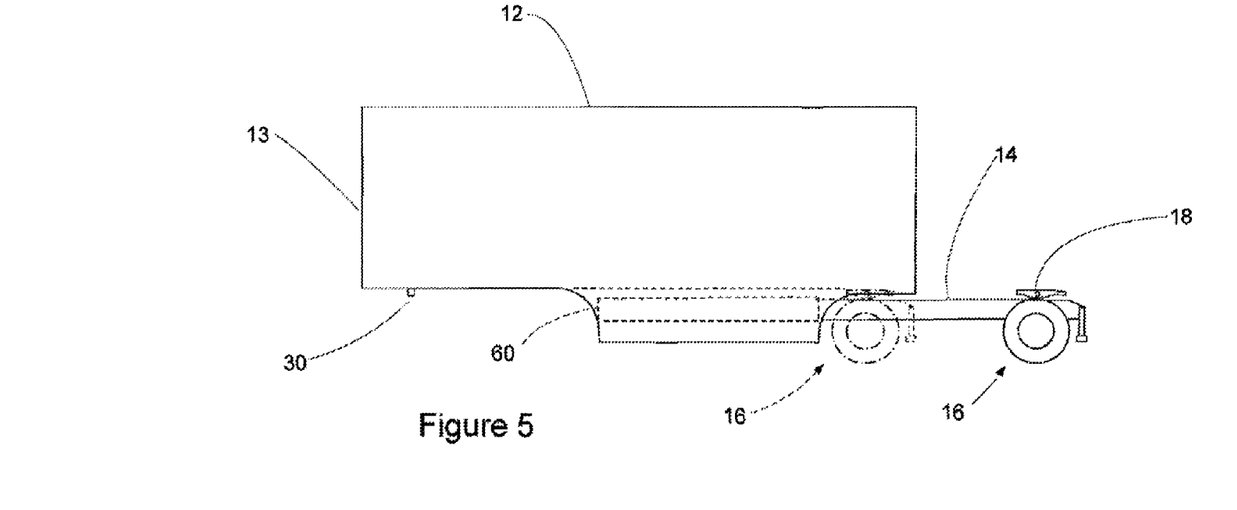
FIG. 5 is a side view of a body unit in accordance with an embodiment of the invention.

In the embodiment of FIG. 2, the power unit 10 and body unit 12 form a non-horizontally articulated unit, but the frame 14 of the body unit 12 is retracted so that the axle assembly 16 is beneath a rear portion of the body 13. The two positions of the frame 14 and axle assembly 16 are shown in FIG. 5. The details of the extendible and retractable frame 14 are described below in connection with FIG. 13.

Figure 4:
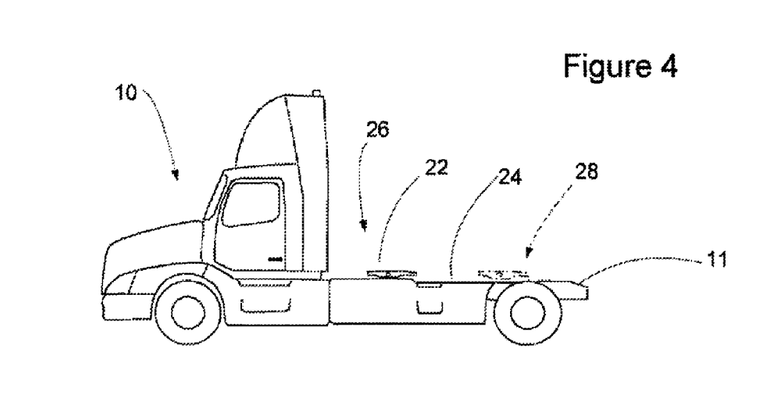
FIG. 4 is a side view of a truck tractor in accordance with an embodiment of the invention.

Referring to FIG. 4, the power unit 10 in accordance with the illustrated embodiment of the invention is an extended wheelbase 4×2 (single drive axle) tractor with a fifth wheel 22 on a sliding fifth wheel support 24. The sliding fifth wheel support 24 of the invention is longer than a conventional sliding fifth wheel support to allow placement of the fifth wheel closer to the cab than is typical. The forward position 26 of the fifth wheel 22 is useful for the non-horizontally articulated coupling shown in FIG. 1 and FIG. 2. Sliding fifth wheel supports allowing the selected movement and positioning of a fifth wheel on a truck tractor frame are known, and will not be described here. The fifth wheel 22 in the rear position 28 on the truck tractor frame allows the power unit 10 to be used as a traditional tractor pulling a semi-trailer, which may be the body unit 12, as shown in FIG. 3, or another semi-trailer.

Referring to FIG. 5, the body unit 12 has dimensions similar to that of a short (28 foot) semi-trailer, that is, in height, length and width. The body and floor have the same construction as a standard semi-trailer, which will not be described here as this is within the ordinary skill in the art. The body unit 12 includes a king pin 30 near a front end of the body 13 for coupling with the fifth wheel 22. A coupling frame 60 is spaced rearward of the king pin 30 and allows the body unit 12 to couple to the power unit in the non-horizontally articulated configuration. The coupling frame 60 is described in more detail in conjunction with FIGS. 9-12, below.

Figures 6, 7:
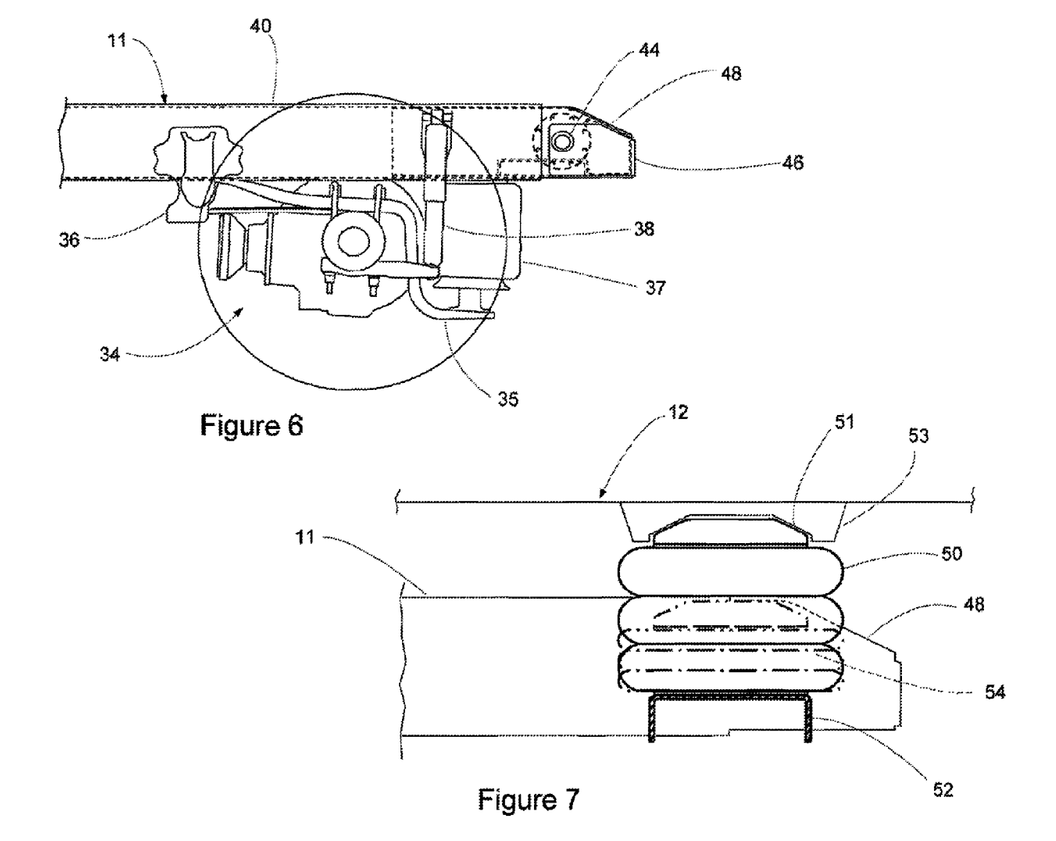
FIG. 6 is a side view of an end portion of a power unit frame in accordance with an embodiment of the invention.
FIG. 7 is a section view of the end portion of FIG. 6 shown with the body unit to illustrate a load distribution device.
Figure 8:
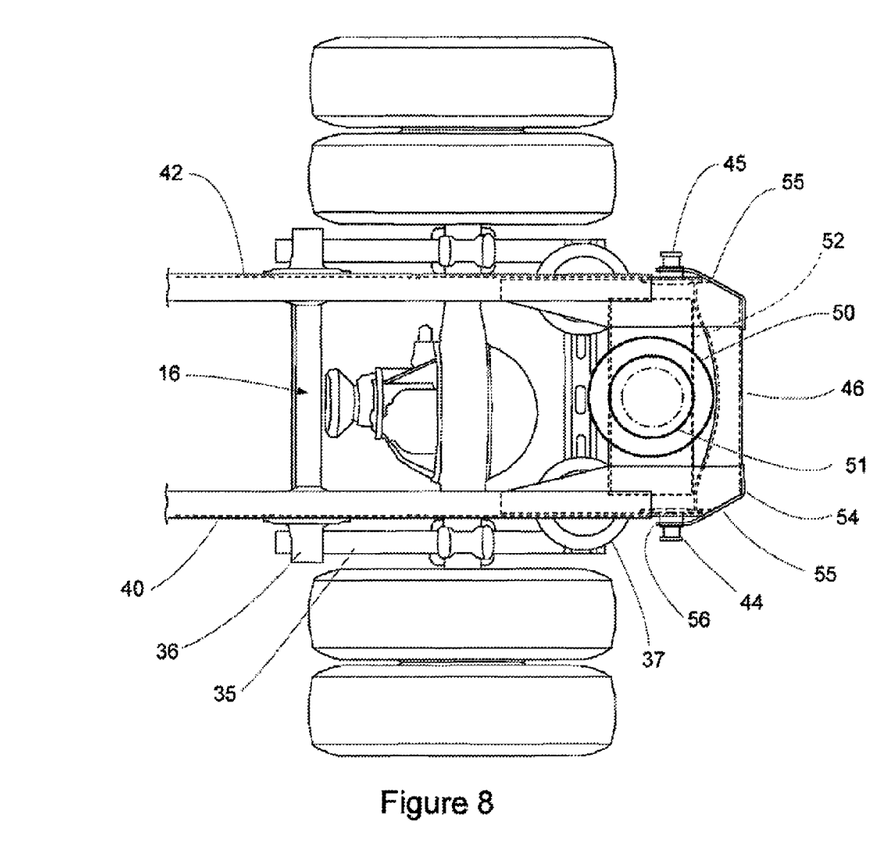
FIG. 8 is a top view of the end portion of the power unit frame shown in FIG. 6.

FIG. 6 shows a side view of an end of the truck tractor frame 11 and FIG. 7 shows a schematic view of the end of the truck tractor frame and the body unit body floor to illustrate a load distribution device 50. The load distribution device is not shown in FIG. 6 for clarity of the drawing. FIG. 8 is a top view of the frame 11 of FIG. 6. The frame 11 may have a conventional suspension 34 for the axle assembly 16, including an arm 35 to which the axle is mounted extending rearward from a hanger bracket 36 and an air spring 37 and a damper 38 mounted between the arm 35 and frame rail 40.

The frame 11 has two connecting pins at the rear sides of the frame, a left pin 44 mounted on the left rail 40 and a right pin 45 mounted on right rail 42 (shown in FIG. 8) for coupling with the body unit 12. Left and right are as viewed from the rear of the frame toward the front. As explained below in connection with FIGS. 9 and 10, the pins 40, 42 serve as positioning guides and vertical articulation limiters for coupling the truck tractor frame 11 to the body unit 12. The pins 44, 45 are members similar to a king pin, having a shaft and a flanged end.

The truck tractor frame 11 includes an end cross member 46 connecting the ends of the frame rails 40, 42 to provide rigidity. A slanted upper surface 48 on the rear of the frame rails 40, 42 assists as a positioning guide when the body unit 12 is docked onto the frame 11, providing a surface for the front of the body unit 12 to slide over if the relative heights are not in alignment.

According to the invention, a load distribution device 50, illustrated in FIG. 7 and FIG. 8, is disposed vertically between the truck tractor frame 11 and the body unit 12. The load distribution device 50 helps distribute the load of the body unit between the rear of the power unit frame 11 and the fifth wheel 22. The load distribution device 50 may be a pneumatic spring, as illustrated, or alternatively, a mechanical spring or hydraulic spring. If the device 50 is either pneumatic or hydraulic, the device pressure can be altered to change the load distribution on the power unit chassis to help prevent overload of the power unit's steer axle system and the drive axle system. A pneumatic or hydraulic spring may be connected to the pneumatic or hydraulic system of the power unit. When deactivated, the device 50 deflates or empties, lowering its height (shown in broken lines in FIG. 7), which allows clearance for the body unit 12 to move over it. The deactivated state is useful for coupling and uncoupling the body unit to the power unit.

The load distribution device 50 may be seated on a cross member 52 mounted between the frame rails 40, 42 on the power unit 14 frame. A cup 53 or recess provided on the body unit 12 receives the top or crown 51 of the spring 50. The load distribution device 50 is shown mounted on the truck tractor frame 11, however, it may alternatively be mounted on the body unit, and appropriate air or hydraulic connections made with the truck tractor systems.

Figure 9:
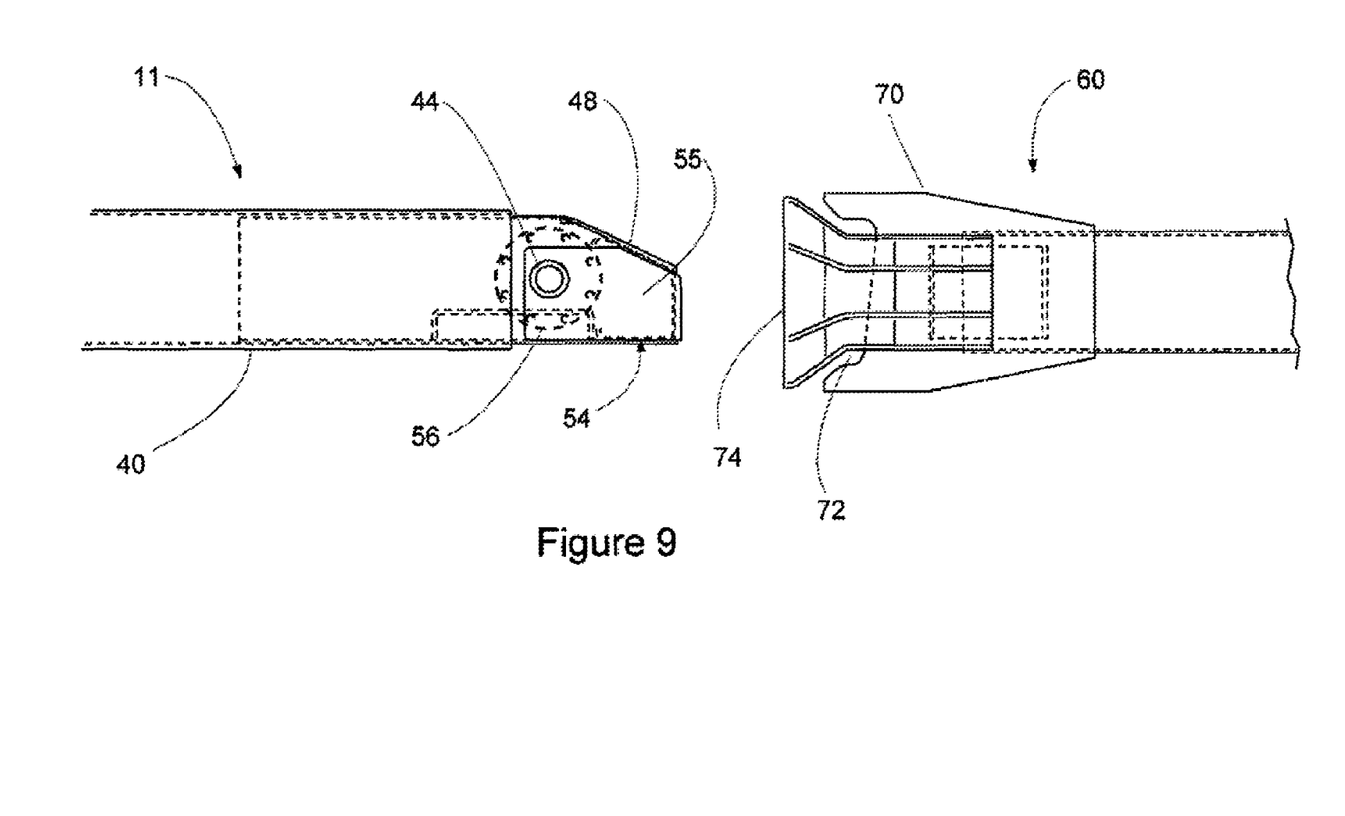
FIG. 9 is a side view showing a coupling mechanism for the power unit and body unit.
Figure 10:
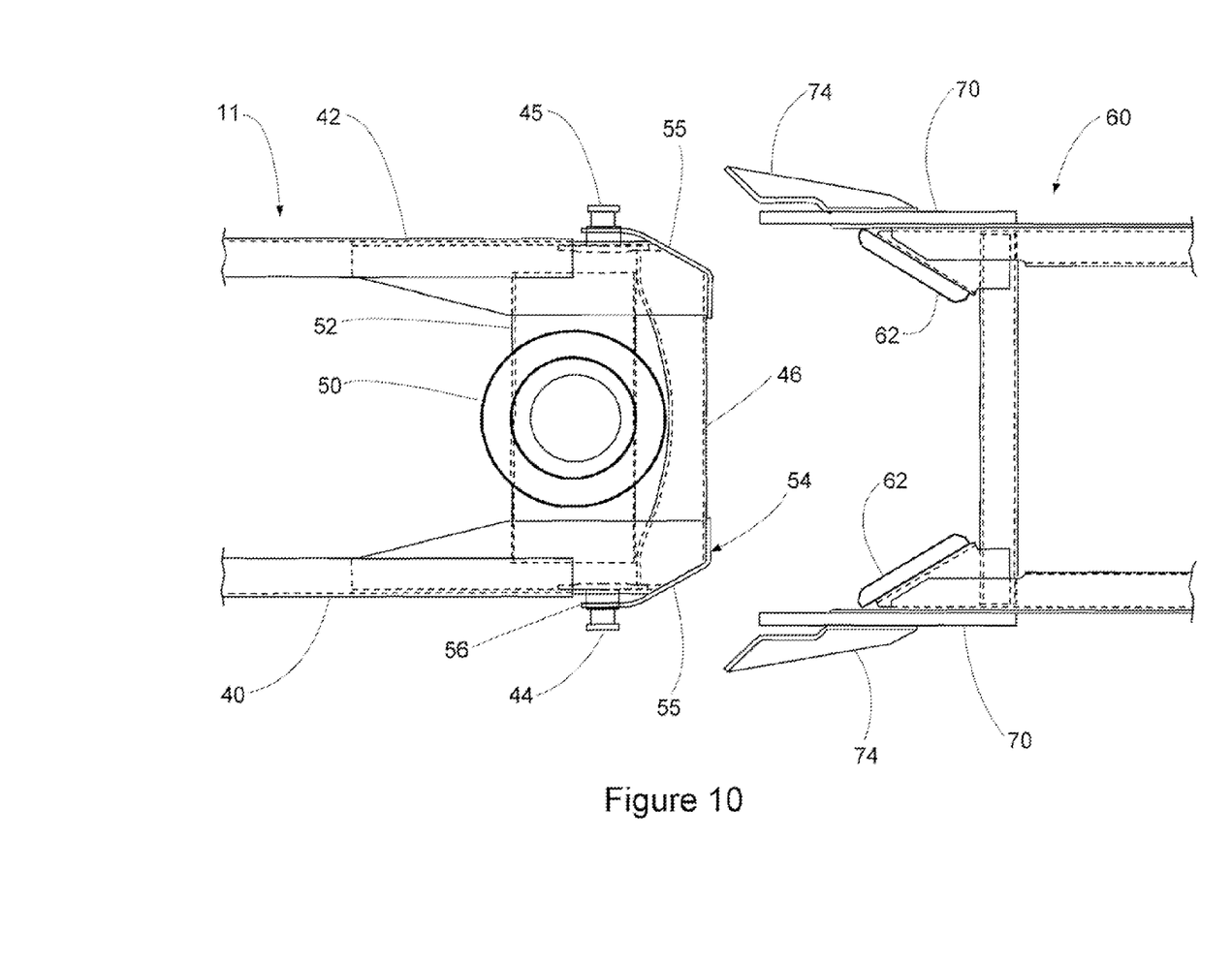
FIG. 10 is a top view of the coupling mechanism of FIG. 9.

Because of the length added by the body unit frame 14 when extended (i.e., the position seen in FIG. 1 and FIG. 5), there is a need in the power unit 10 to body unit 12 coupling for restricted articulation in the vertical ("Z") direction to navigate some terrain conditions (e.g., traversing a raised railroad crossing or backing to a loading dock that has a storm drainage dip). FIG. 9 shows a simplified side view from the left and FIG. 10 shows a simplified top view of the power unit 12 frame 11 and body unit 12 coupling frame 60. The power unit frame 11 includes a wear plate 54, preferably made of stainless steel, mounted on each rear corner (only the left rear corner is shown in FIGS. 9 and 10). The wear plate 54 is shaped with a chamfered face 55 to assist in aligning the power unit frame 11 and the body unit coupling frame 60. The pin 44 is mounted to a laterally facing surface 56 of the wear plate forward of the chamfered face 55.

The body unit coupling frame 60 includes a bumper 62 mounted at the same angle as the chamfered face 55 of the wear plate 54 to abut the chamfered face 55 when the coupling frame is coupled to the power unit frame 11. The bumper 62 may be formed of an elastomeric material such as rubber or the like. An alignment jaw 70 is mounted on the coupling frame 60 to extend forward from the coupling frame on a lateral outer side of the coupling frame. The alignment jaw 70 includes a vertical slot 72 to receive the pin 44. The vertical slot 72 allows the pin, and accordingly, the power unit frame 11, to move vertically relative to the coupling frame 60 and body unit 12. An alignment cap 74 is provided laterally outward of the alignment jaw 70 to aid in aligning the power unit frame 11 to the coupling frame 60 during coupling. The head of the pin 44 is captured between the alignment jaw 70 and the alignment cap 74. It should be understood that the chamfered faces 55 on each side of the frame 11 define a tapered end that couples with the two bumpers 62 in the coupling frame 60. The tapered end abutment with the bumpers and the pins 44, 45 coupling to the alignment jaws on the left and right sides of the body unit coupling frame 60 help prevent relative lateral movement of the power unit frame and body unit frame.

Figure 11:
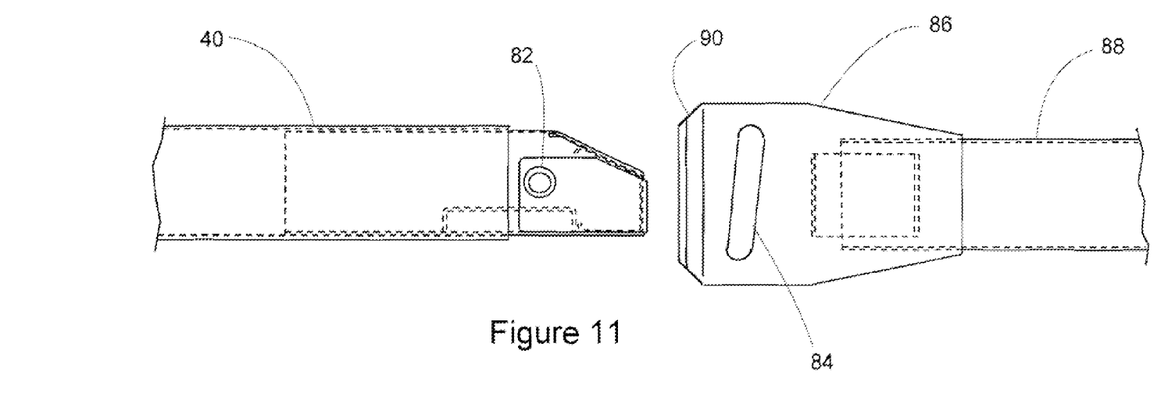
FIG. 11 is a side view of an alternative coupling mechanism for the power unit and body unit.
Figure 12:
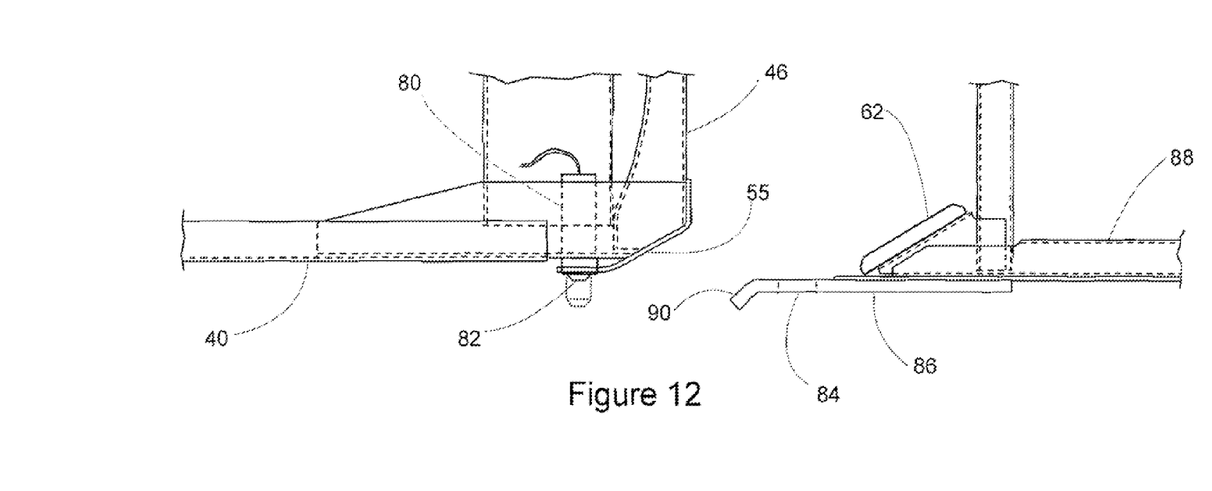
FIG. 12 is a top view of the coupling mechanism of FIG. 11.

An alternative arrangement of the coupling between the power unit 10 and body unit 12 allowing vertical pivoting movement is shown in the side view of FIG. 11 and top view of FIG. 12. The power unit frame 11 in this embodiment includes a pneumatic cylinder 80 to drive a lock pin 82 through a hole in the frame 11 to engage a slot 84 formed in an alignment jaw or coupling frame rail 86 of the body unit 12. The coupling frame rail 86 is disposed to overlap the frame 11 of the power unit, which provides constraint to relative lateral movement of the power unit 10 and body unit 12. In the illustrated embodiment, the coupling frame rail 86 is a piece mounted laterally outward on the main frame rail 88 of the body unit 12. When coupled, the main frame rail 88 of the body unit abuts the frame rail 40 of the power unit and the pneumatic cylinder drives the lock pin 82 into the slot 84. The alignment jaw or coupling frame rail 86 includes a flared end 90 to assist in aligning the body unit 12 to the power unit 10. Alternatively, the body unit main frame rail 88 may be disposed to overlap the frame rail 40 of the power unit itself to provide an alignment jaw. According to this embodiment, the body unit king pin 30 is engaged with the fifth wheel 22 of the power unit 10, as described above.

Figure 13:
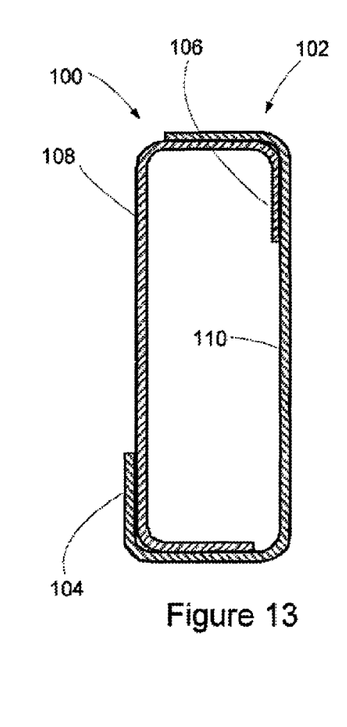
FIG. 13 is an end view of a sliding frame rail of the body unit.

The body unit frame also provides structure for the extending and retracting the frame from the end of the body unit, that is, between the positions shown in FIG. 1 and FIG. 2. This allows the wheel/axle assembly 16 and fifth wheel 18 to be positioned under the body unit or extended rearward of the body unit to couple with a semi-trailer. FIG. 13 shows an end view of an extendible frame 14. A sliding frame 14 includes two frame "G" profile sections 100, 102 for each frame rail. The sections 100, 102 are nested with one section 100 inside the other section 102 and the short vertical webs 104, 106 engaging the long vertical web 108, 110 of the other section. Alternatively, the sliding frame rail could include two "C" channels arranged back to back with a bearing mechanism, for example, a collar, connecting them. A locking device, for example, the Quick-Draw pneumatic pin-pull mechanism available from Hendrickson International Corporation of Canton, Ohio, may be used to secure the sliding frame rail in the selected position.

As will be understood by those skilled in the art, one of the sliding sections will be attached to the body unit sub-frame and the other to the axle assembly 16.

The axle assembly 16 has additional features to facilitate its modes of operation. Because the body unit 12 is connected as a non-horizontally articulated body to the power unit, the axle assembly 16 is configured as a steerable axle for maneuverability of the combination as well as to minimize the tire scrubbing due to the long distance between the power unit's drive axle and the body unit axle 16 when the body unit frame 14 is in the extended position. This steering capability may be accomplished by either a "self-steer" configuration (using axle caster and stabilizer shock absorbers to facilitate the tires' return to the straight ahead position) or a hydraulic or electric power steering system connected to the power unit's steering system. For example, a self-steering system such as the Composilite or the Paralift steerable suspension systems from Hendrickson International Corporation of Canton, Ohio, may be used.

The axle assembly 16 also has the ability to lock the position of the tires in the straight ahead position for when the body unit is standing alone (separated from the power unit) and when it used as a semi-trailer. The axle assembly may include actuator pins on the ends on the axle to lock the axle in the straight ahead position. The actuator pins may be manually set, or alternatively, activated electronically, as part of the vehicle's operational logic, when the vehicle reaches a certain speed on the highway to enhance the vehicle combination handling stability.

The axle assembly 16 also includes the ability to reverse the axle caster (angle of the axle in the direction of travel of the vehicle). When in steering mode, the axle caster provides the geometry that keeps the axle tires in the straight ahead position and also facilitates the return to straight ahead position of the tires after a vehicle turning maneuver. When the power unit and body unit as a tractor and freight box configuration backs up the axle assembly 16 must reverse caster or the tires will severely rotate to one side or the other. Allowing this to happen would cause the vehicle to be un-maneuverable and damage the tires and/or axle. The reverse caster of the axle is accomplished by adding a pivoting mechanism to the axle that is activated when the power unit's transmission is shifted into reverse.

An alternative arrangement of the body unit and power unit is compatible with ocean shipping containers. According to current practice, shipping containers are off loaded from the ship and then positioned on and locked to a semi-trailer chassis, which is hauled from the port dock by a traditional tractor type vehicle. Typically, only one container (regardless of length) can be hauled at a time due to available equipment configurations. According to an alternative embodiment of the invention, a chassis unit, having no body, but including the extendible frame and axle and coupling structure described above, can accept a shorter (typically 20') shipping container. This unit can be coupled to a power unit, and an additional current, traditional container semi-chassis loaded with any length shipping container can also be pulled by the same Power Unit, thus improving freight efficiency by 50% (two containers moved in a single trip).

The invention has been described in terms of preferred principles, embodiments, and structure; however, those skilled in the art will understand that substitutions of equivalent structure may be made for the structure described here without departing from the scope of the invention as defined by the appended claims.

What is claimed is:

1. A truck tractor and removable body unit system selectively configurable as a fixed body or an articulated truck-trailer combination, comprising:
    a truck tractor having a frame supporting a drive axle and a steer axle and having a fifth wheel mounted on the frame,
    a body unit having a body mounted on a frame, the frame supported by an axle and having a king pin for releasably engaging a fifth wheel,
    a coupling mechanism for releasably coupling the truck tractor frame and the body unit frame while allowing relative vertical pivoting movement between the truck tractor and body unit about the king pin and fifth wheel, and constraining relative lateral movement, the coupling mechanism releasably coupling a rear of the truck tractor frame to a location on the body unit spaced from the king pin, wherein, the coupling mechanism comprises a pair of laterally extending pins mounted to opposite sides of one of the truck tractor frame and body unit frame and a pair of coupling plates mounted to opposite sides of the other of the truck tractor frame and body unit, the coupling plates each including a vertically oriented slot shaped to accept a pin and allow relative vertical movement of the pin in the slot; and
    an adjustable spring mounted to one of the truck tractor and body unit to act between the truck tractor frame and the body unit frame to adjust a loading between the truck tractor frame and body unit.

2. The system of claim 1, wherein the axle of the body unit is a steerable axle.

3. The system of claim 1, wherein each pin comprises a shaft and a flanged end, and the slot in each coupling plate is open on one vertical side to receive the pin shaft with the flanged end overlapping the coupling plate.

4. The system of claim 1, wherein the pins include a device to drive the pins between and extended position and a retracted position.

5. The system of claim 1, wherein a trailing portion of the body unit frame extends beyond an end of the body unit, the axle being mounted on the extended portion.

6. The system of claim 5, further comprising a fifth wheel mounted on the trailing portion of the body unit frame for coupling a semi-trailer.

7. The system of claim 5, wherein the trailing portion of the body unit frame is movable between an extended position with the axle beyond the end of the body unit and a retracted position in which the axle is disposed beneath the body unit.

8. The system of claim 7, wherein the body unit frame comprises main frame rails having a profile defining a channel and wherein the trailing portion of the body unit frame comprises frame rails slidably nested in the channel of the body unit main frame rails.

9. The system of claim 1, wherein the fifth wheel on the truck tractor frame is mounted for sliding for selectively positioning the fifth wheel on the truck tractor frame in forward and rear positions.

10. A truck tractor and removable body unit system selectively configurable as a fixed body or an articulated truck-trailer combination, comprising:
    a truck tractor having a frame supporting a drive axle and a steer axle and having a fifth wheel mounted on the frame,
    a body unit having a body mounted on a frame, the frame supported by an axle and having a king pin for releasably engaging a fifth wheel, a trailing portion of the body unit frame extending beyond an end of the body unit, the axle being mounted on the extended portion, wherein the trailing portion of the body unit frame is movable between an extended position with the axle beyond the end of the body unit and a retracted position in which the axle is disposed beneath the body unit;
    a coupling mechanism for releasably coupling the truck tractor frame and the body unit frame while allowing relative vertical pivoting movement between the truck tractor and body unit about the king pin and fifth wheel, and constraining relative lateral movement, the coupling mechanism releasably coupling a rear of the truck tractor frame to a location on the body unit spaced from the king pin, and
    an adjustable spring mounted to one of the truck tractor and body unit to act between the truck tractor frame and the body unit frame to adjust a loading between the truck tractor frame and body unit.

11. The system of claim 10, wherein the axle of the body unit is a steerable axle.

12. The system of claim 10, wherein, the coupling mechanism comprises a pair of laterally extending pins mounted to opposite sides of one of the truck tractor frame and body unit frame, and a pair of coupling plates mounted to opposite sides of the other of the truck tractor frame and body unit, the coupling plates each including a vertically oriented slot shaped to accept a pin and allow relative vertical movement of the pin in the slot.

13. The system of claim 12, wherein each pin comprises a shaft and a flanged end, and the slot in each coupling plate is open on one vertical side to receive the pin shaft with the flanged end overlapping the coupling plate.

14. The system of claim 12, wherein the pins include a device to drive the pins between and extended position and a retracted position.

15. The system of claim 10, further comprising a fifth wheel mounted on the trailing portion of the body unit frame for coupling a semi-trailer.

16. The system of claim 10, wherein the body unit frame comprises main frame rails having a profile defining a channel and wherein the trailing portion of the body unit frame comprises frame rails slidably nested in the channel of the body unit main frame rails.

17. The system of claim 10, wherein the fifth wheel on the truck tractor frame is mounted for sliding for selectively positioning the fifth wheel on the truck tractor frame in forward and rear positions.

* * * * *